United States Patent [19]

Worrell et al.

[11] Patent Number: 4,927,536
[45] Date of Patent: May 22, 1990

[54] HYDROCYCLONE SEPARATION SYSTEM

[75] Inventors: J. Robert Worrell, Tulsa; William D. Wakley, Broken Arrow; Grant A. Young, Tulsa, all of Okla.

[73] Assignee: Amoco Corporation, Chicago, Ill.

[21] Appl. No.: 326,351

[22] Filed: Mar. 21, 1989

[51] Int. Cl.⁵ .................. B01D 17/038; B04C 5/28
[52] U.S. Cl. ................... 210/512.2; 55/345; 55/349; 209/144; 209/211
[58] Field of Search .......... 55/204, 345, 459.1, 55/343, 349; 209/144, 211; 210/512.1, 512.2, 512.3

[56] References Cited

U.S. PATENT DOCUMENTS

| | | | |
|---|---|---|---|
| 2,754,968 | 7/1956 | Vegter et al. | 210/512.2 |
| 3,243,941 | 4/1966 | Peterson | 210/512.1 |
| 3,306,461 | 2/1967 | Weis | 210/512.1 |
| 3,764,008 | 10/1973 | Darley et al. | 210/512.2 |
| 4,190,523 | 2/1980 | Niemeijer | 209/211 |
| 4,473,478 | 9/1984 | Chivrall | 210/512.2 |
| 4,544,486 | 10/1985 | Carroll | 210/512.1 |
| 4,650,584 | 3/1987 | Macierewicz | 210/512.2 |
| 4,688,650 | 8/1987 | Hayatdavoudi et al. | 210/512.2 |
| 4,711,720 | 12/1987 | Young | 210/512.2 |
| 4,773,989 | 9/1988 | Pfalzer et al. | 210/512.2 |
| 4,797,203 | 1/1989 | Macierewicz | 55/459.1 |
| 4,857,197 | 8/1989 | Young et al. | 209/211 |
| 4,863,500 | 9/1989 | Rombout et al. | 209/144 |

FOREIGN PATENT DOCUMENTS

| | | | |
|---|---|---|---|
| 2382273 | 11/1978 | France | 210/512.1 |
| 0766644 | 9/1980 | U.S.S.R. | 209/211 |

Primary Examiner—Frank Spear
Assistant Examiner—Joseph Drodge
Attorney, Agent, or Firm—Scott H. Brown; Fred E. Hook

[57] ABSTRACT

A hydrocyclone separation system is disclosed for separating a fluid mixture into at least two separate density components and for precluding remixing of semi-separated higher density components. A first and second hydrocyclone separators each has a central overflow outlet, a tangential fluid inlet, and a central overflow outlet. The first and second hydrocyclone separators are oppositely disposed such that a curved flow direction conduit extends from the underflow outlet of the first hydrocyclone separator to the tangential fluid inlet of the second hydrocyclone separator. Thereby, rotating fluid exiting the underflow of the first hydrocyclone separator is tangentially passed into the inlet of the second hydrocyclone separator precluding remixing of semi-separated higher density components and increasing the overall separation efficiency of the system.

3 Claims, 5 Drawing Sheets

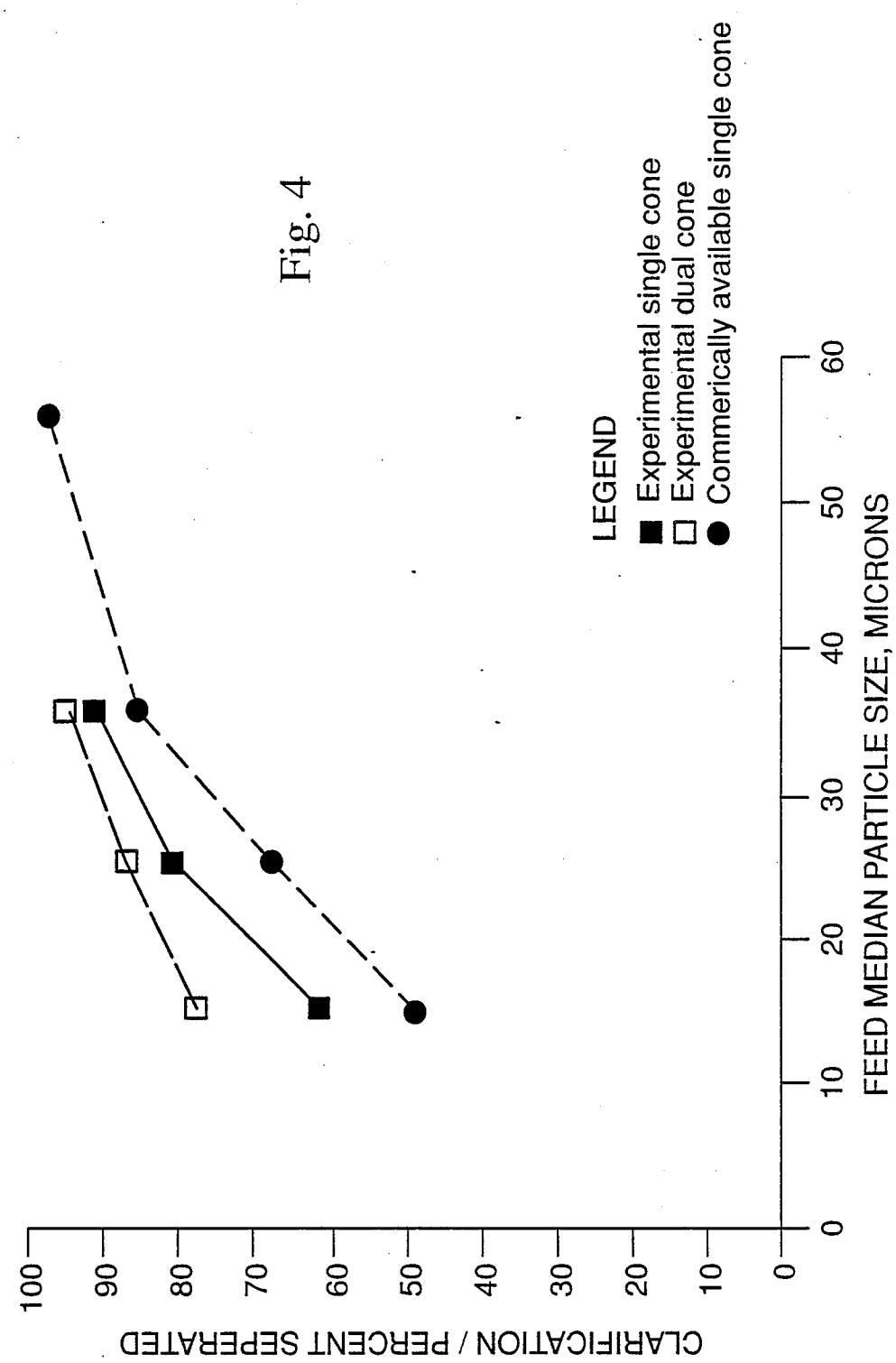

HYDROCYCLONE SEPARATION SYSTEM

BACKGROUND OF THE INVENTION

1. Field of the Invention

The present invention relates to hydrocyclone separators used for separating components of fluid mixtures and, more particularly, to such hydrocyclone separators that are used to separate small quantities of oil from large volumes of water.

2. Setting of the Invention

The use of hydrocyclone separators for the separation of components of fluid mixtures is well known, such as disclosed in U.S. Pat. Nos. 3,306,461, 4,544,486 and 4,698,152. In such hydrocyclone separators, a liquid stream is fed tangentially into an upper cylindrical portion where the liquid is accelerated in a spiral as the liquid flows through a conical lower portion. As the liquid spirals, centrifugal forces draw the more dense components to the outer portion of the rotating column of liquid and the less dense components of the liquid migrate to a central column area. The dense components are discharged through a lower underflow opening in the conical lower portion and the less dense components are passed upwardly through a centrally located overflow opening or outlet.

It has been found that a plurality of hydrocyclone separators used in series can be more efficient in separating the components than using a single stage hydrocyclone. Various hydrocyclone separator systems have been used in the past that included several hydrocyclone separators used in series. Therein, the less dense components of a first hydrocyclone separator are introduced into a second hydrocyclone separator. The less dense components exit the first hydrocyclone separators as a rotating, upwardly traveling fluid stream wherein the higher density components are already at the outer periphery before the stream is introduced into the second hydrocyclone separator. However, the rotating stream's rotation is stopped or greatly diminished by the conduit or piping used, thereby causing the semi-separated higher density components to be remixed prior to being introduced into the second hydrocyclone separator. U.S. Pat. No. 4,711,720 discloses a hydrocyclone separator system wherein the overflow from a first hydrocyclone separator is tangentially passed into at least one secondary hydrocyclone separator in a manner preventing the higher density semi-separated components from being remixed. In this specific application, this arrangement is not beneficial. Specifically, hydrocyclone separators are being utilized for the separation of small quantities of oil from large volumes of produced water. It is necessary to retain the spinning momentum of the fluid as the fluid traverses from the underflow of the first cone to the feed of the second cone.

Thus, there is a need for improved hydrocyclone separation systems which can take advantage of the general principles described in U.S. Pat. No. 4,711,720 to improve the separation efficiency of hydrocyclone separator systems used in removing oil from water.

SUMMARY OF THE INVENTION

The present invention has been contemplated to overcome the foregoing deficiencies and meet the above-described needs. Specifically, a hydrocyclone separation system is disclosed for separating a fluid mixture into at least separate density components and for precluding the remixing of semi-separated higher density components. A first and a second hydrocyclone separator, each has a tangential fluid inlet and an overflow fluid outlet adjacent a first end, and each has an underflow fluid outlet adjacent an opposite second end. The first and second hydrocyclone separators are arranged such that a flow direction conduit extends tangentially from the underflow fluid outlet of the first hydrocyclone separator to the tangential fluid inlet of the second hydrocyclone separator. The flow direction conduit preferably has a rectangular cross-section and is curved so that semi-separated lighter density components exiting the first hydrocyclone separator are precluded from remixing as they enter the inlet of the second hydrocyclone separator, thus increasing their separation efficiency. Furthermore, higher density components occurring at the underflow will also remain separated as they enter the next feed section.

BRIEF DESCRIPTION OF THE DRAWINGS

FIG. 4 is a graph showing the separation efficiency of a hydrocyclone separation system of the present invention compared to two other hydrocyclone separation systems.

DETAILED DESCRIPTION OF THE PREFERRED EMBODIMENTS

The present invention provides a hydrocyclone separation system for separating a fluid mixture into at least two separate density components and for precluding remixing of the semi-separated higher density components. The present invention can be utilized to separate any two fluidized components such as solids from liquid, solids from gas, and liquids from liquids. As used throughout the present discussion, the hydrocyclone separation system of the present invention will be described in relation to removing small quantities of oil from a stream of water.

Figure 1:
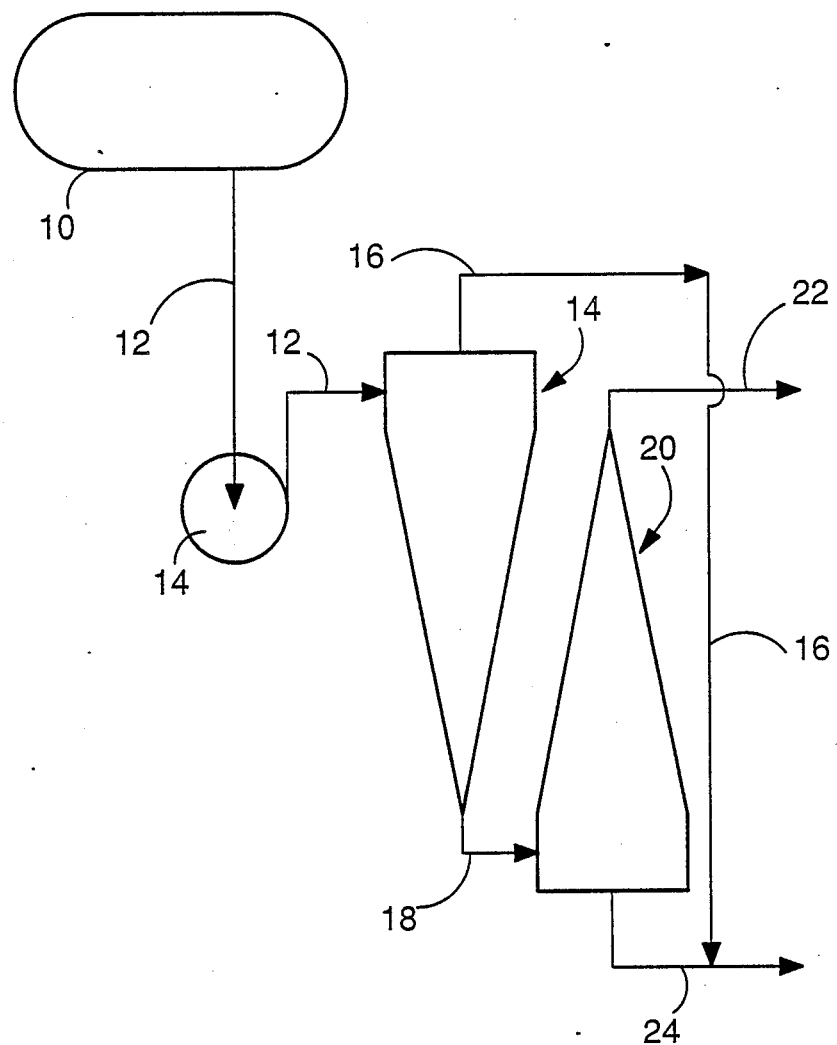
FIG. 1 is a schematic diagram of a hydrocyclone separation system embodying the present invention.

As shown in FIG. 1, a stream of oil and water from a producing well is passed to a first separation vessel 10, usually referred to as an oil/water knock-out, wherein gas is removed and initially separated oil is removed for storage and/or treatment. Oily water is then passed from the separation vessel 10 through a conduit 12 to a pump 14 and from there to a tangential fluid inlet (not shown) of a first hydrocyclone separator 14. The lesser density component, which in this case is oil, passes upwardly through a centrally located fluid overflow outlet (not shown) into a conduit 16 for eventual passage of the oil to storage and/or treatment as desired.

The separated higher density component, which in this case is water, passes through an underflow outlet (not shown) of the first hydrocyclone separator 14 through a flow direction conduit 18, which would be described in more detail below. At this point, it should be understood that the flow direction conduit 18 passes the swirling higher density components from the underflow tangentially into a tangential flow inlet (not shown) of a second hydrocyclone separator 20 in a manner as to preclude remixing of the higher density semi-separated components. Separated water exits the second hydrocyclone separator 20 through a central underflow outlet (not shown) and into a conduit 22 for discharge. The separated oil passes through a central overflow outlet (not shown) into a conduit 24, which in turn merges into the oil carrying conduit 16.

In general appearance, the arrangement of the first hydrocyclone separator 14 with the second hydrocyclone separator 20 appears to be similar to that disclosed in U.S. Pat. Nos. 4,544,486 and 4,698,152. However, there is no disclosure or suggestion within these patents of connecting the hydrocyclone separators in series to prevent remixing of semi-separated higher density components. Specifically, the patents only refer to the first and second hydrocyclone separators as being arranged so that the first hydrocyclone separator would provide the flow restriction necessary for proper operation of the secondary hydrocyclone.

To provide the improvements desired in separation efficiency, the inventors have found that the first and the second hydrocyclone separators 14 and 20 need to be connected by a specially configured flow direction conduit 18. To better understand this feature, FIG. 2 should be referred to. The first hydrocyclone separator 14 and the second hydrocyclone separator 20 are arranged such that they are oppositely disposed, i.e., the underflow of one is adjacent the overflow of another, and in as close proximity as possible to minimize the travel distance separated water must pass from the first to the second hydrocyclone separator. The first and second hydrocyclone separators 14 and 20, respectively, can be contained within a protective conduit 26. The hydrocyclone separators can be separately formed and inserted into the conduit 26 or can be molded from PVC or polyurethane plastic 27 and then inserted into the conduit 26 for protection and handling.

Figure 2:
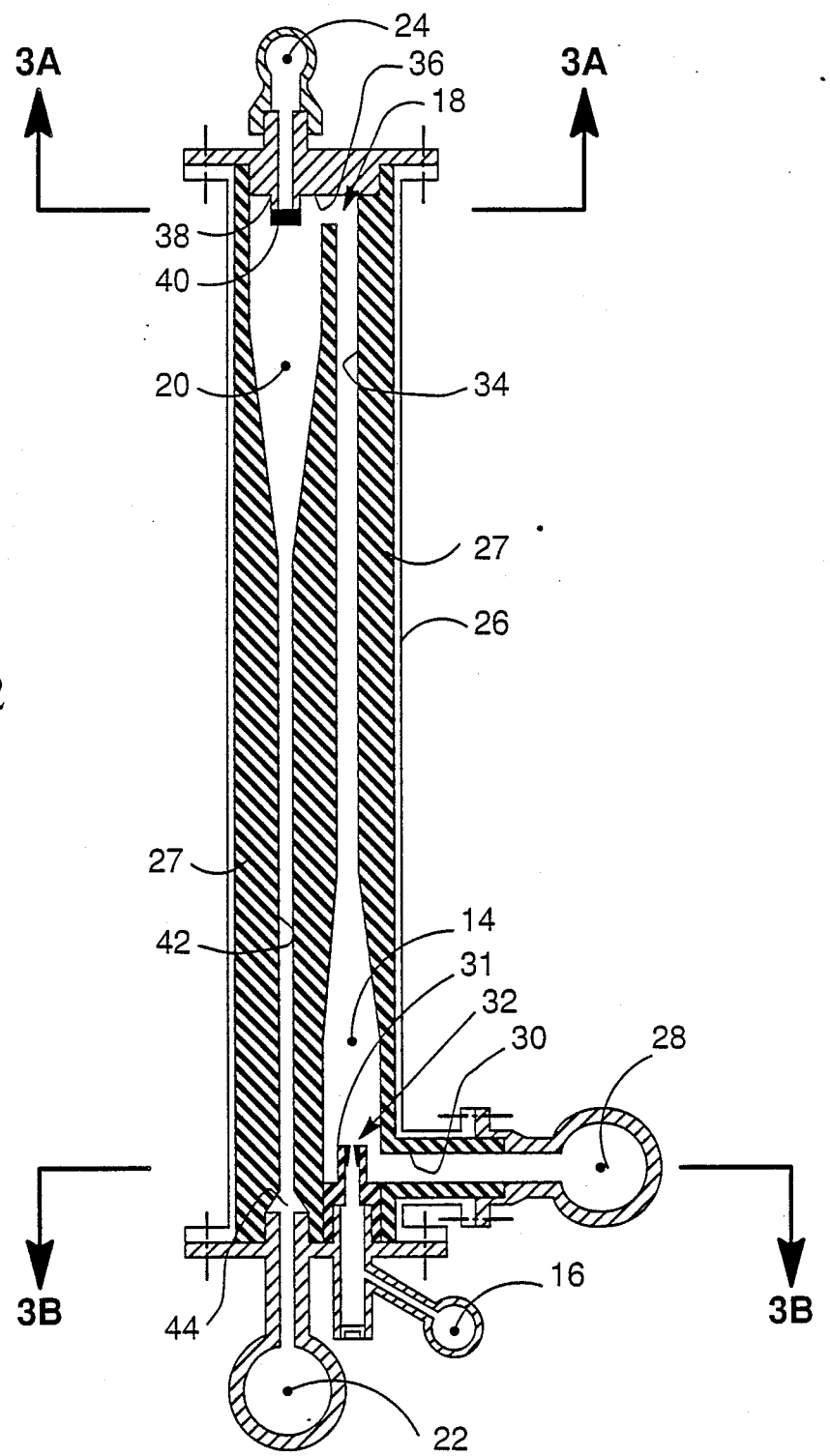
FIG. 2 is a cutaway elevation view of two hydrocyclone separators used within one embodiment of the hydrocyclone separation system of the present invention.

As shown in FIG. 2, an oil and water stream from a main supply conduit 28 is passed into a tangential fluid inlet 30 of the first hydrocyclone separator 14. The lesser density components, such as oil, passes outwardly through a vortex finding tube 31, with a fixed or variable diameter outlet 32, and then through the oil carrying conduit 16. The higher density components, such as water, pass through a tailpipe section 34 of the first hydrocyclone separator 14 and into the flow direction conduit 18, which connects with a tangential flow inlet 36 of the second hydrocyclone separator 20. Again, the separated lighter density component such as oil, passes through the vortex finding tube 38 and overflow outlet 40 into the oil carrying conduit 24. The separated water passes through a tailpipe section 42 of the second hydrocyclone separator 20 through a central underflow outlet 44 and into the water discharge conduit 22.

Figure 3A:
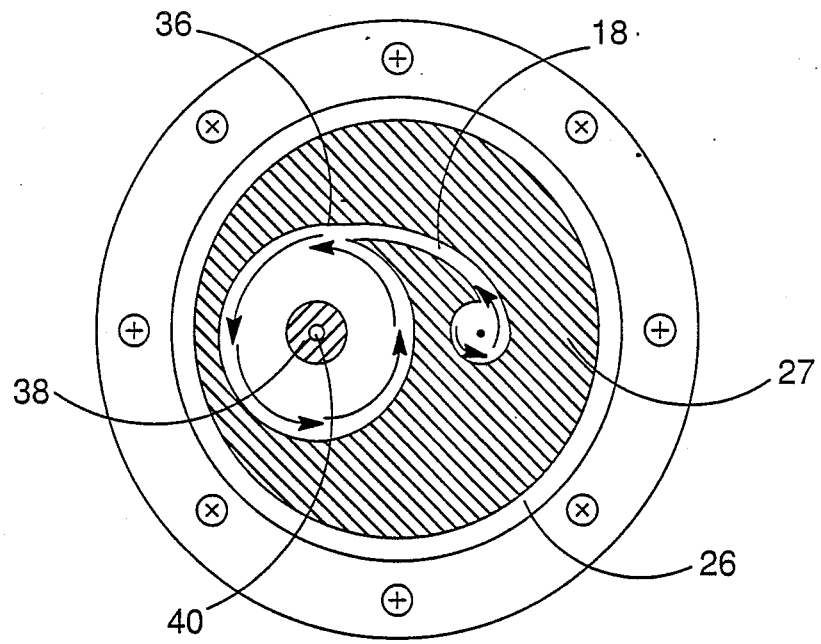
FIG. 3A is a cross-sectional view taken along line A—A of FIG. 2.

The flow direction conduit 18 connecting the first hydrocyclone separator 14 to the second hydrocyclone separator 20 can be seen in FIG. 3A. The spiralling stream of water passing through the conduit 18 traverses a very short distance and the conduit 18 is curved so the spiralling stream of water is directed tangentially into the inlet 36 of the second hydrocyclone separator 20. Preferably, the cross-section of the conduit 18 has a rectangular configuration. U.S. Pat. No. 4,711,720 utilized the same general principle for passing through the overflow of a first hydrocyclone separator to the tangential inlet of at least one secondary hydrocyclone separator. However, in the case of using U.S. '720 the oil would be treated. The present invention has been designed to treat the separated water passing through the underflow of the first hydrocyclone separator. In this manner, very little fluid momentum is lost. Thus, the separation efficiency of this arrangement will be improved over that experienced with the previous systems.

Figure 3B:
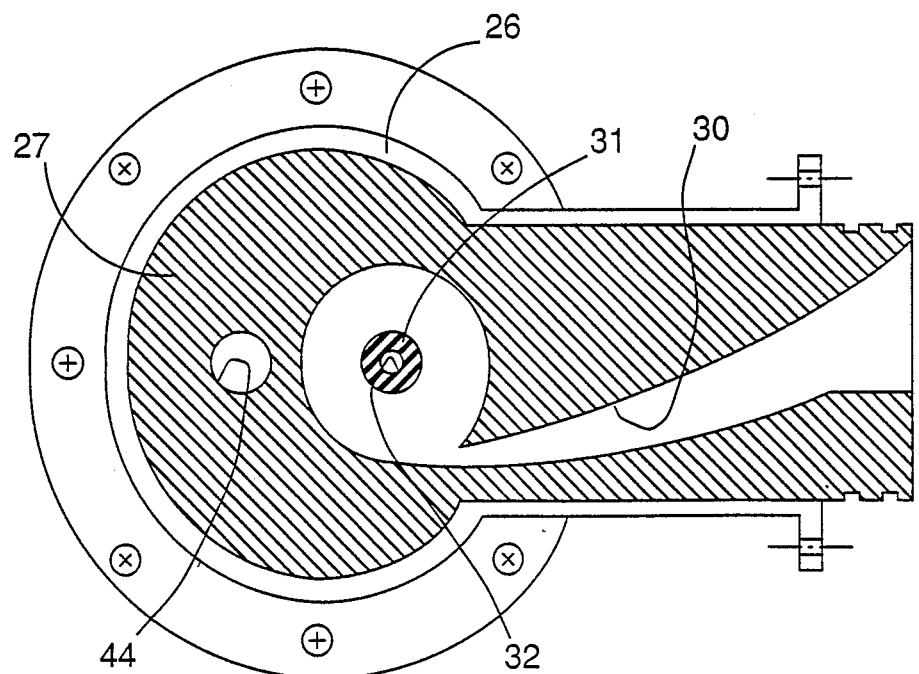
FIG. 3B is a cross-sectional view taken along line B—B of FIG. 2.

FIG. 3B is provided to illustrate the arrangement of the fluid inlet 30 of the first hydrocyclone separator 14 and the fluid underflow outlet 44 of the second hydrocyclone separator 20.

To test the separation efficiency of the hydrocyclone separator system of the present invention, three hydrocyclone separator units were assembled. The first unit was a commercially available oil-water separator made by BWM Vortoil Ltd. The second unit was a single hydrocyclone separator developed by the inventors hereof. The third unit utilized for the test was a combination of two hydrocyclone separators in accordance with the present invention and having the same dimensions of the previously described second unit.

For the tests 1000 mg/liter of Bumpass crude oil at 70° F. was introduced at 32 gallons per minute into the Vortoil units and 60 gpm into the second set of hydrocyclones. For the tests, the crude oil was sheared in size so that the oil droplet size was varied from about 15 to about 58 microns. The results of the tests as shown in FIG. 4, where it can be seen that the second unit hydrocyclone separator performed marketedly better over the feed range size than the commercially available Vortoil unit, which has been universally considered the best unit commercially available. Further, the two-stage hydrocyclone separator unit embodying the present invention had a somewhat better separation efficiency.

Figure 5:
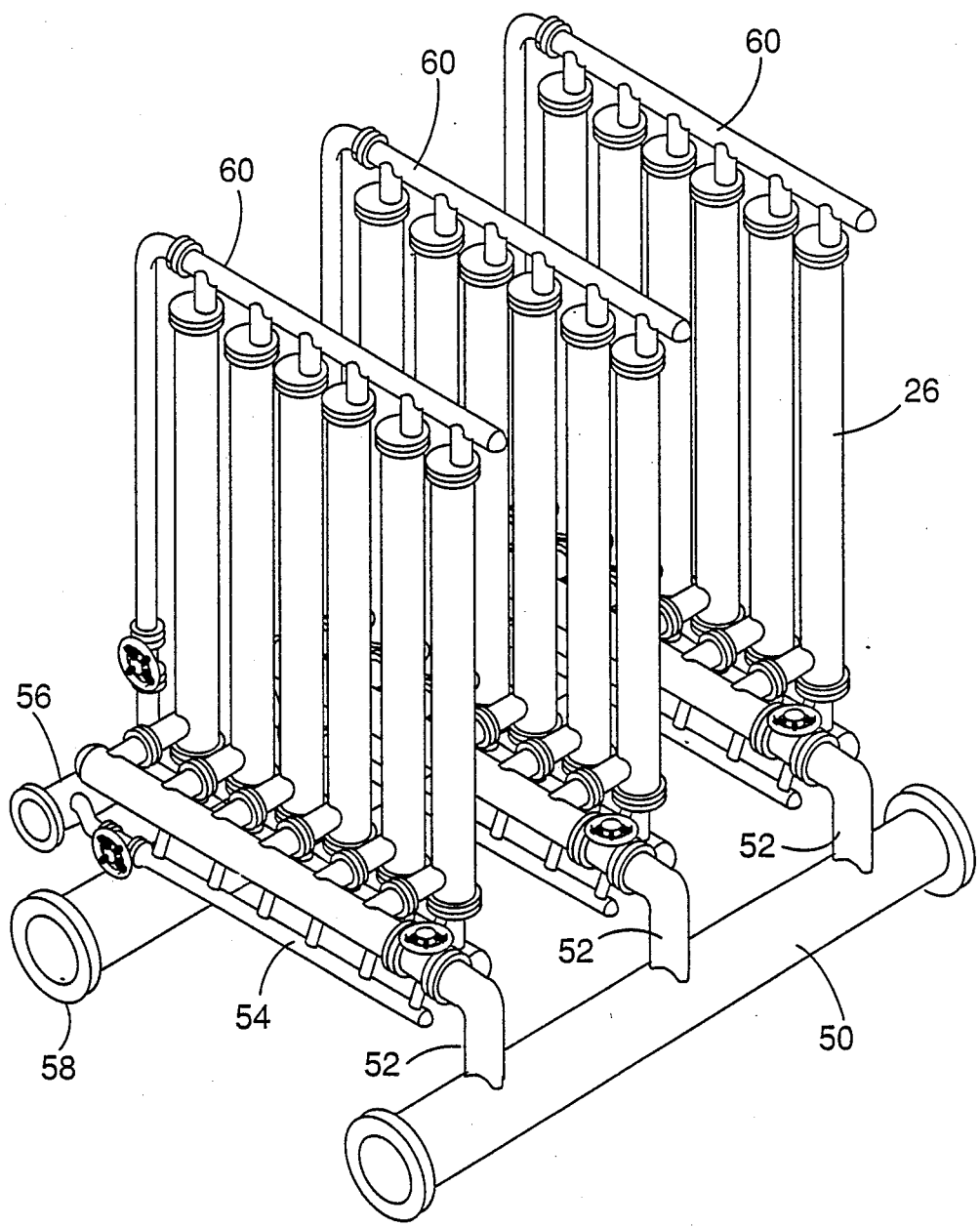
FIG. 5 is a perspective elevational view of a hydrocyclone separation system embodying features of the present invention.

As described above, another important feature of the present invention besides having the flow direction conduit, is that by encapsulating the two hydrocyclone separators in opposite arrangement, weight and space-saving can occur. A new hydrocyclone separation system is shown in FIG. 5 wherein three rows of six tubes 26 each are assembled and within each tube 26 are the two hydrocyclone separators 14 and 20. A main oil-water fluid feed 50 passes fluid through branch lines 52 and then into the rows of tangential fluid inlets of each hydrocyclone separator contained within each tube 26. The separated oil from the first hydrocyclone separator is passed through conduit 54 to a main oil line 56. The underflow of the first hydrocyclone separator 14 contained within each cylinder 26 passes into the tangential fluid inlet of the second hydrocyclone separator 20 in accordance with the present invention. Separated water passes through a water collection conduit 58 for eventual discharge. The oil overflow from the second hydrocyclone separator 20 passes into conduit 60, which in turn are connected to the primary oil outlet 56. In the present invention, the feed line 50 and outflow line 58 can be of sufficient diameter and strength that they can serve as the skid mounts and each of the conduits 52, 54, 56, and 60 can support each cylinder 26 in a manner such that the overall size of the unit can be reduced. Therefore, from the point of view of weight saving and size conservation, utilization of the present invention with its unique packaging manner can be proved very beneficial to offsea oil exploration production efforts.

Wherein the present invention has been described in a particular relation to the drawings attached hereto, it should be understood that other and further modifications, apart from those shown or suggested herein, may be made within the scope and spirit of the present invention.

What is claimed is:

1. A hydrocyclone separation system for separating a fluid mixture into at least two components having differing densities, comprising:

a first hydrocyclone separator and a second hydrocyclone separator contained within an elongated protective conduit and each being substantially parallel to a longitudinal axis of the conduit, each hydrocyclone separator having a tangential fluid inlet, an overflow fluid outlet and an underflow fluid outlet;

the first hydrocyclone separator and the second hydrocyclone separator being oppositely disposed with respect to each other with the underflow fluid outlet of the first hydrocyclone separator being spaced immediately adjacent to the tangential fluid inlet of the second hydrocyclone separator and the overflow fluid outlet of the first hydrocyclone separator being spaced immediately adjacent the underflow fluid outlet of the second hydrocyclone separator; and a curved flow direction conduit extending tangentially from the underflow fluid outlet of the first hydrocyclone separator to the tangential fluid inlet of the second hydrocyclone separator to preclude remixing of differing density components.

2. A hydrocyclone separation system of claim 1 wherein both the first and second hydrocyclone separators are formed within a body of material contained with the conduit.

3. A hydrocyclone separation system of claim 5 wherein the flow direction conduit has a rectangular cross-section.

* * * * *

UNITED STATES PATENT AND TRADEMARK OFFICE
CERTIFICATE OF CORRECTION

PATENT NO. : 4,927,536

DATED : May 22, 1990

INVENTOR(S) : WORRELL, ET AL

It is certified that error appears in the above--identified patent and that said Letters Patent is hereby corrected as shown below:

Column 6:
Claim 3, line 1, "Claim 5" should read --Claim 1--.

Signed and Sealed this

Seventh Day of April, 1992

*Attest:*

HARRY F. MANBECK, JR.

*Attesting Officer*      *Commissioner of Patents and Trademarks*